United States Patent
Berger et al.

(10) Patent No.: US 10,158,443 B1
(45) Date of Patent: Dec. 18, 2018

(54) METHODS AND APPARATUS FOR FINE TIMING MEASUREMENT WITH FREQUENCY DOMAIN PROCESSING

(71) Applicant: Marvell International Ltd., Hamilton (BM)

(72) Inventors: Christian R. Berger, San Jose, CA (US); Niranjan Grandhe, San Jose, CA (US); Sudhir Srinivasa, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/690,198

(22) Filed: Aug. 29, 2017

Related U.S. Application Data

(60) Provisional application No. 62/383,121, filed on Sep. 2, 2016.

(51) Int. Cl.
| | |
|---|---|
| H04L 7/00 | (2006.01) |
| H04J 3/06 | (2006.01) |
| G04F 10/00 | (2006.01) |
| H04W 56/00 | (2009.01) |

(52) U.S. Cl.
CPC .......... *H04J 3/0682* (2013.01); *G04F 10/005* (2013.01); *H04J 3/0685* (2013.01); *H04W 56/004* (2013.01); *H04W 56/0015* (2013.01); *H04W 56/0025* (2013.01)

(58) Field of Classification Search
CPC .... H04L 7/0008; H04W 64/00; H04W 74/04; H04W 72/04
USPC ................................. 375/356, 354; 370/235
See application file for complete search history.

(56) References Cited

U.S. PATENT DOCUMENTS

| | | | |
|---|---|---|---|
| 2015/0271776 A1* | 9/2015 | Michaelovich | H04W 64/00 455/456.1 |
| 2016/0353306 A1* | 12/2016 | Sanderovich | H04W 24/10 |

* cited by examiner

*Primary Examiner* — Khai Tran

(57) ABSTRACT

The present disclosure describes methods and apparatuses for fine timing measurement with frequency domain processing. In some aspects, a first device receives a frame that is transmitted by a second device via a wireless medium. A degree to which the frame is affected by multipath propagation in the wireless medium is determined based on frequency power and linear phase of the frame, which can be calculated using frequency domain processing. Based on the degree to which the frame is affected, a time of arrival calculation for the frame can be compensated for effects related to the multipath propagation. By so doing, the effects of multipath propagation can be addressed without time domain processing, which is typically complex and more expensive to implement.

20 Claims, 10 Drawing Sheets

METHODS AND APPARATUS FOR FINE TIMING MEASUREMENT WITH FREQUENCY DOMAIN PROCESSING

CROSS REFERENCE TO RELATED APPLICATION

This present disclosure claims priority to U.S. Provisional Patent Application Ser. No. 62/383,121 filed Sep. 2, 2016, the disclosure of which is incorporated by reference herein in its entirety.

BACKGROUND

Computing and electronic devices are often capable of wirelessly communicating with other devices or network controllers though which various resources are accessible. To facilitate communication in a wireless network, a device and network controller typically configure and negotiate parameters of a wireless link over which the devices communicate. When a wireless network has multiple client devices, the network controller may divide or allocate access to wireless network based on time. To do so, respective local clocks of the network controller and client devices of the wireless network must be synchronized to ensure each device communicates during its allocated time slot.

Synchronization of the local clocks of the devices is often accomplished by exchanging time information and calculating clock differences between given pairs of the devices. Calculating these clock differences, however, may rely on respective times of arrival for various packets that carry the time information between devices. In some cases, the exchange of time information and time of arrivals are complicated by multipath propagation, which results in reflections of a packet that also arrive at a receiving device. Thus, the receiving device may receive not only a direct transmission of the packet, but several reflected versions of the packet that arrive at different times and with varying signal strength. As such, determining an acceptable time of arrival for a packet in multipath environments is often prevented by the reception of multiple reflections of the same packet, which in turn degrades accuracy of clock synchronization and other time-based functions of the wireless network.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method is described that receives, at a first device and via a wireless medium, a frame that is transmitted by a second device. A degree to which the frame is affected by multipath propagation in the wireless medium is determined based on frequency power and linear phase of the frame. Based on the degree to which the frame is affected, a time of arrival calculation for the frame can be compensated for effects related to the multipath propagation. By so doing, the effects of multipath propagation may be addressed without time domain processing, which is typically complex and expensive to implement.

In other aspects, a System-on-Chip comprises a wireless communication controller, a hardware-based processor configured to implement frequency domain data processing, and a fine timing measurement (FTM) manager. The FTM manager is configured to receive, via the wireless communication controller, a frame transmitted by a remote device through a wireless medium. Based on frequency power and linear phase of the frame, the FTM manager determines a degree to which the frame is affected by multipath propagation in the wireless medium. The FTM manager then compensates, based on the degree to which the frame is affected by multipath propagation, a time of arrival calculation for the frame to provide a compensated time of arrival for the frame.

In yet other aspects, a computer-readable storage media comprises instructions that, responsive to execution by a hardware-based processor, implement a fine timing measurement (FTM) manager. The FTM manager receives, via a wireless communication controller associated with the hardware-based processor, a frame transmitted by a remote device through a wireless medium. A degree to which the frame is affected by multipath propagation in the wireless medium is determined based on frequency power and linear phase of the frame. The FTM manager also compensates, based on the degree to which the frame is affected by multipath propagation, a time of arrival calculation for the frame to provide a compensated time of arrival for the frame.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of fine timing measurement (FTM) with frequency domain processing are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
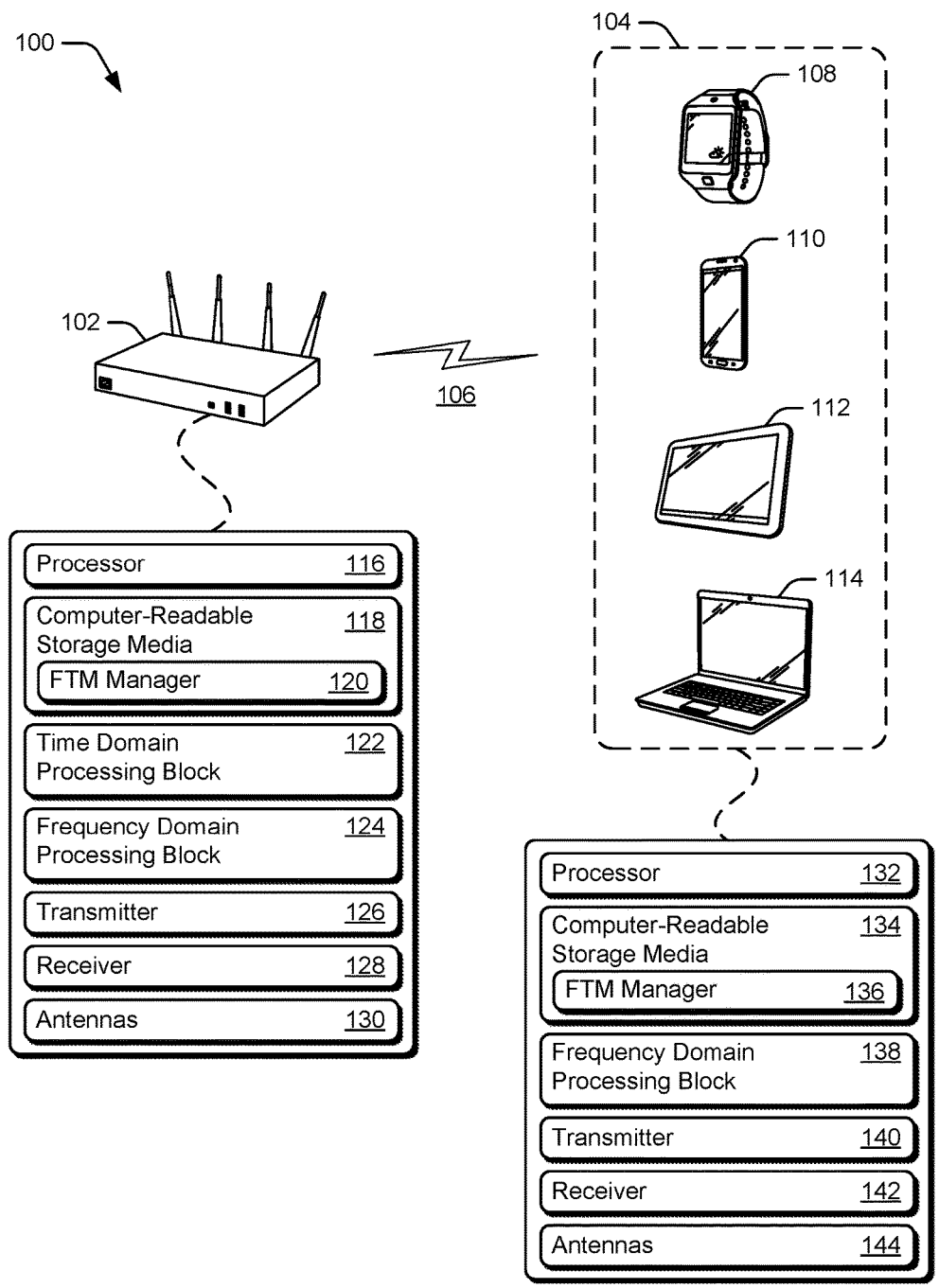
FIG. 1 illustrates an example operating environment that includes wireless devices implemented in accordance with one or more aspects.

Conventional techniques for measuring and synchronizing timing between devices of a wireless network often rely on exchanging time information between the devices. Typically, synchronization of respective clocks of the devices is accomplished by exchanging time information and measuring clock differences between given pairs of the devices. Measuring the clock differences, however, relies on respective times of arrival for various packets that carry the time information between devices. In multipath environments, which result in several reflections of a packet that arrive at a receiving device in addition to a direct path packet, calculating an accurate time of arrival can be difficult.

In a conventional fine timing measurement (FTM) exchange for example, a time of arrival for packets can be determined relative a portion of a packet and pulse shaping filter of a receiver through which the packet is processed. Generally, a width of the pulse shaping filter is inversely proportional to transmission bandwidth of the packet, such that wider transmission bandwidth of a packet results in more accurate time of arrival calculation. In orthogonal frequency-division multiplexing (OFDM) systems, however, a length or duration of the packet portion used to determine time of arrival is independent of packet bandwidth. As such, accuracy of time of arrival measurements in OFDM systems is often limited (e.g., to hundreds of nanoseconds) regardless of available packet bandwidth. This issue is further complicated by multipath propagation, which skews an estimated time of arrival due to reflections of a packet that arrive at a receiving device at different times and with varying signal strength.

This disclosure describes techniques and apparatuses for fine timing measurement (FTM) with frequency domain processing. Generally, these techniques and apparatuses may improve time of arrival measurements of frames exchanged by devices in a multipath environment, such as in FTM frame exchanges or for round-trip time calculations. In some cases, a time of arrival for a frame can be determined in a range of nanoseconds, which as part of a round-trip time, can be used to accurately determine a distance between two devices (e.g., to approximately meter or sub-meter precision). Further, these accurately determined distances can be used in combination with knowledge of device locations within a wireless network to enable a position of other network devices to be precisely determined through trilateration.

In various aspects of FTM with frequency domain processing, a first device receives a frame that is transmitted by a second device through a wireless medium. A degree to which the frame is affected by multipath propagation in the wireless medium is determined based on frequency power and linear phase of the frame, which can be calculated using frequency domain processing. Based on the degree to which the frame is affected, a time of arrival calculation for the frame can be compensated for effects related to the multipath propagation. By so doing, the effects of multipath propagation can be addressed without time domain processing, which is typically complex and more expensive to implement than frequency domain processing.

This and other aspects described herein may be implemented to reduce or counter delays introduced in time of arrival measurements by multipath propagation as a frame traverses a wireless medium. In some cases, the aspects are leveraged to provide more accurate time of arrival measurements by using time domain processing to distinguish timing of a first or direct path of a frame from those of multipaths traveled by reflections of the frame. Alternately or additionally, an offset between the first path and the multipaths can be determined to correct a calculated time of arrival or enable another device to make such a correction. Generally, correcting or compensating time of arrival calculations improves round-trip time measurements, which in turn enables distances between devices to be determined more accurately.

The following discussion describes an operating environment, techniques that may be employed in the operating environment, and a System-on-Chip (SoC) in which components of the operating environment can be embodied. In the context of the present disclosure, reference is made to the operating environment by way of example only.

Operating Environment

FIG. 1 illustrates an example operating environment 100 that includes an example host device 102 and example client devices 104 in accordance with one or more aspects. Each of these devices may be wireless-network-enabled and capable of communicating data, packets, and/or frames over a wireless link 106. The wireless link 106 may include any suitable type of wireless communication link or wireless network connection. For example, the wireless link 106 may be implemented in whole or in part as a wireless local-area-network (WLAN), ad-hoc WLAN, wireless mesh network, near-field communication (NFC) link, wireless personal-area-network (WPAN), wireless wide-area-network (WWAN), or short-range wireless network. The wireless link 106 may be implemented in accordance with any suitable communication protocol or standard, such as IEEE 802.11-2012, IEEE 802.11-2016, IEEE 802.11ak, and the like.

In this example, the host device 102 is embodied as an access point that is capable of providing and managing a wireless network that includes the wireless link 106. In other cases, the host device 102 may include or be embodied as a base station, enhanced node base station, wireless router, broadband router, modem device, drone controller, or other network administration device. The client devices 104 of the example environment 100 include a smart-watch 108, smart-phone 110, tablet computer 112, and laptop computer 114. Although not shown, other configurations of the client devices 104 are also contemplated, such as automation equipment, drone, camera, wearable smart-device, Internet-of-Things (IoT) device, gaming device, personal media device, navigation device, mobile-internet device (MID), network-attached-storage (NAS) drive, mobile gaming console, and so on.

Generally, the host device 102 provides connectivity to the Internet, other networks, or networked-resources through a backhaul link (not shown), which may be either wired or wireless (e.g., a T1 line, fiber optic link, broadband cable network, intranet, a wireless-wide-area network). The backhaul link may include or connect with data networks operated by an internet service provider, such as a digital subscriber line or broadband cable provider and may interface with the host device 102 via an appropriately configured modem (not shown). While associated with the host device 102 via the wireless link 106, the smart-watch 108, smart-phone 110, tablet computer 112, or laptop computer 114 may access the Internet or other networks for which host device 102 acts as a gateway.

The host device 102 includes a processor 116 configured to execute processor-executable instructions and computer-readable storage media 118 (CRM 118). In some cases, the processor 116 is implemented as an application processor (e.g., multicore processor) or baseband processor to manage operation and connectivity of the host device 102. The CRM 118 of the host device 102 may include any suitable type and/or combination of storage media, such as read-only memory (ROM), random access memory (RAM), or Flash memory. In the context of the disclosure, the CRM 118 is implemented as storage media, and thus does not include transitory signals or carrier waves. The CRM 118 may store firmware, an operating system, or applications of the host device 102 as instructions that are executed by the processor 116 to implement various functionalities of the host device 102. In this example, a fine timing measurement manager 120 (FTM manager 120) is embodied on the CRM 118 of the host device 102.

The FTM manager 120 of the host device 102 can be implemented to perform various functions associated with time measurement, such as FTM frame exchanges or time of arrival calculations. For example, the FTM manager 120 may determine a degree to which a received frame is affected by multipath propagation. In some cases, the FTM manager 120 compensates or corrects a time of arrival calculation to address delay associated with multipath propagation. Alternately or additionally, the FTM manager 120 may transmit an indication of an offset for correcting a time of arrival to another device to enable the other device to make such corrections. The implementations and uses of the FTM manager 120 vary, and are described throughout the disclosure.

In this example, the host device 102 includes a time domain processing block 122 and a frequency domain processing block 124, though in some cases the time domain processing block 122 may be omitted. The time domain processing block 122 may include any suitable combination of hardware, processors, or software modules configured to implement time domain processing and associated functions, such as Fourier transforms and complex filtering. The frequency domain processing block 124 may include any suitable combination of hardware, processors, or software modules configured to implement frequency domain processing and associated functions, such as phase and frequency-based power calculations. Generally, the FTM manager 120 is able to access or control the time domain processing block 122 or the frequency domain processing block 124 to implement respective time domain or frequency domain functionalities.

The host device 102 also includes a transmitter 126, receiver 128, and antennas 130 for providing a wireless network, communicating with the client devices 104, or communicating other wirelessly-enabled devices. The transmitter 126 or receiver 128 may include any suitable number of respective communication paths (e.g., transmit or receive chains) to support transmission or reception of multiple spatial streams of data. Although not shown, radio frequency (RF) front-end circuitry of the host device 102 can couple or connect the transmitter 126 or receiver 128 to the antennas 130 to facilitate various types of wireless communication. The antennas 130 of the host device 102 may include an array of multiple antennas that are configured similar to or differently from each other.

Each of client devices 104 includes a processor 132 and computer-readable storage media 134 (CRM 134). The processor 132 can be any suitable type of processor, either single-core or multi-core, for executing instructions or code associated with applications, firmware, or an operating system of the client device 104. The CRM 134 may include any type and/or combination of suitable storage media, such as RAM, non-volatile RAM (NVRAM), ROM, or Flash memory useful to store data of applications and/or an operating system of the client device 104. In the context of the disclosure, the CRM 134 is implemented as storage media, and thus does not include transitory signals or carrier waves. In this example, another fine timing measurement manager 136 (FTM manager 136) is embodied on the CRM 134 of the client device 104.

The FTM manager 136 of the client device 104 may be implemented similar to or differently from the FTM manager 120 of the host device 102, and can perform various functions associated with time measurement, such as FTM frame exchanges or time of arrival calculations. For example, the FTM manager 136 may determine a degree to which a received frame is affected by multipath propagation. In some cases, the FTM manager 136 compensates or corrects a time of arrival calculation to address delay associated with multipath propagation. Alternately or additionally, the FTM manager 136 may receive an indication of an offset for correcting a time of arrival from another device. The implementations and uses of the FTM manager 136 vary, and are described throughout the disclosure.

In this example, the client device 104 includes a frequency domain processing block 138, though in some cases a client device may also include a time domain processing block (not shown). The frequency domain processing block 138 may include any suitable combination of hardware, processors, or software modules configured to implement frequency domain processing and associated functions, such as phase and frequency-based power calculations. In some cases, the frequency domain processing block 138 may be used to determine a ratio of frequency power to phase-roll magnitude. Generally, the FTM manager 136 is able to access or control the frequency domain processing block 138 to implement frequency domain functionalities.

Each of the client devices 104 also includes a transmitter 140, receiver 142, and antennas 144 for communicating with the host device 102 or other wirelessly-enabled devices. Although shown as separate entities, the transmitter 140 and receiver 142 may be implemented in combination as a transceiver component that supports both transmit and receive functionalities. The transmitter 140 or receiver 142 may include any suitable number of respective communication paths (e.g., transmit or receive chains) to support transmission or reception of multiple spatial streams of data. Front-end circuitry (not shown) of the client device 104 may couple or connect the transmitter 140 or receiver 142 to the antennas 144 to facilitate various types of wireless communication. The antennas 144 may include an array of multiple antennas that are configured similar to or differently from each other.

Figure 2:
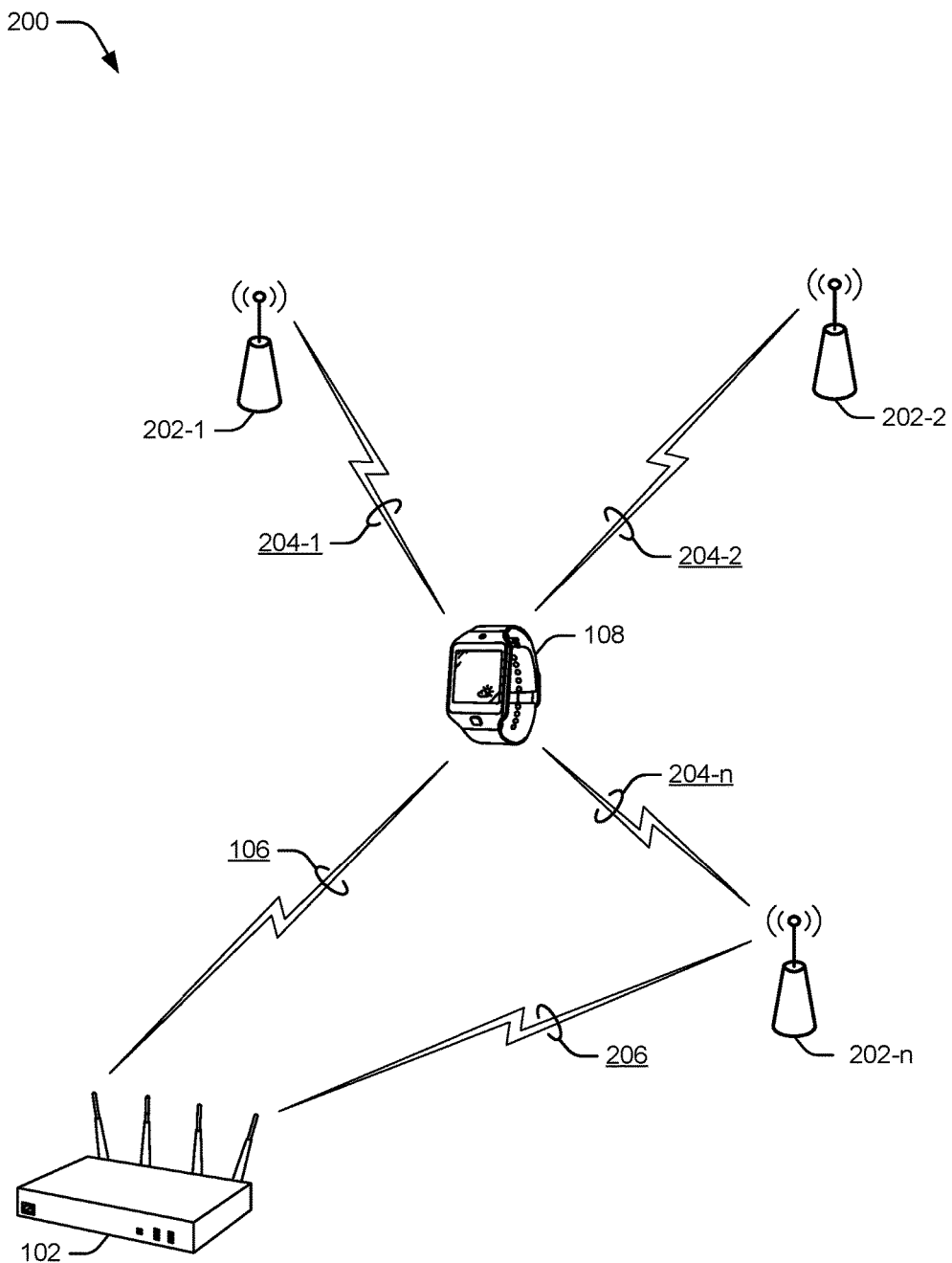
FIG. 2 illustrates an example wireless network in which devices of FIG. 1 may communicate as an FTM initiator or an FTM responder.

FIG. 2 illustrates an example wireless network 200 in which a host device 102 and client device 104 may communicate as an FTM initiator or an FTM responder. The wireless network 200 may be configured as any suitable type of network, such as an infrastructure network managed by the host device 102, a mesh network, or a peer-to-peer network in which each device communicates directly with or through other peer devices. In this example, a client device 104 is configured as a smart-watch 108 that is part of the wireless network 200, which is administrated or managed by host device 102. As described with reference to FIG. 1, the smart-watch 108 communicates with the host device 102

(e.g., wireless router or access point) to access the Internet or other resources of the wireless network 200.

The wireless network 200 may also include any suitable number of other wireless devices 202-1 through 202-n, which can be configured as either additional host devices 102 or client devices 104. As shown in FIG. 2, the smart-watch 108 can also communicate with any of the wireless devices 202-1 through 202-n via respective wireless links 204-1 through 204-n, which may be implemented similar to or differently from wireless link 106. Alternately or additionally, the host device 102 may communicate with one of the wireless devices 202-1 through 202-n via another wireless link 206, such as to communicate information for managing the wireless network 200. In some aspects, the host device 102 or the smart-watch 108 may exchange beacons, data packets, or data frames over one of the wireless links to synchronize timing with, or measure round-trip time (RTT) between, the smart-watch and a respective one of the other devices. From a RTT of frames communicated between two devices, an FTM manager may determine a distance between the two devices.

Figure 3:
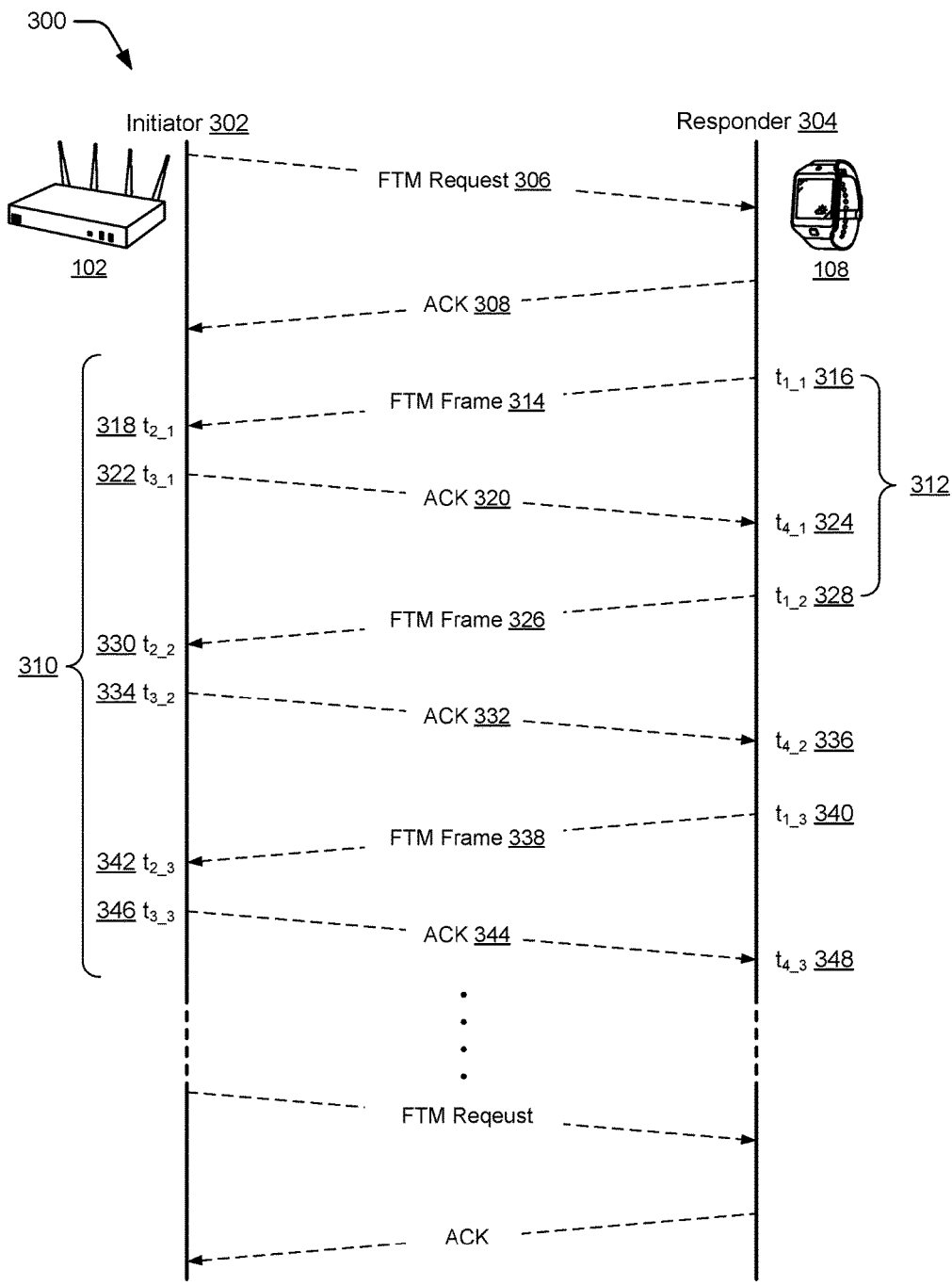
FIG. 3 illustrates an example timeline of communication between an FTM initiator and an FTM responder.

By way of example, consider FIG. 3 which illustrates a timeline 300 of fine timing measurement (FTM) communications between an FTM initiator 302 and an FTM responder 304. In this example, the host device 102 is configured as the FTM initiator and the smart-watch 108 is configured as the FTM responder 304, though these roles may be altered or negotiated between the devices. Although described with reference to an FTM exchange or process, any suitable form of beacons, packets, frames, and/or payload information may be used to transmit or receive timing information between devices. Alternately or additionally, a transmitted frame or signal may not include timing information, but can be transmitted at a known or predetermined time such that timing information can be determined based on receipt of the frame of signal. Throughout the FTM exchange, frames may be communicated using a same antenna of an initiator 302 and a same antenna of a responder 304 such that consistency of a wireless channel or distance between the devices can be better maintained during the exchange.

With reference to timeline 300, the initiator 302 transmits an FTM request 306 to the responder 304 to initiate or negotiate parameters of the FTM frame exchange. The FTM request 306 may include or propose any suitable parameters for the FTM exchange, such as a number of frames, intervals between frames or frame bursts, channel bandwidth, supported frame or packet formats, and the like. The responder 304 may transmit an acknowledgement 308 (ACK 308) to confirm reception of the FTM request 306. In some cases, the ACK 308 also confirms acceptance of the parameters of the FTM request 306. In other cases, the ACK 308 may reject those parameters and may include alternate parameters selected by the responder 304 or be followed by another FTM request (not shown) of the responder 304 that includes other parameters for the FTM exchange.

An FTM exchange 310 (e.g., frame burst) that follows the FTM request 306 and ACK 308 may include any suitable number of frames communicated with, or without, a predefined FTM frame interval 312 between FTM frames. As shown in FIG. 3, the responder transmits a first FTM frame 314 at time $t_{1\_1}$ 316 to the initiator 302 of the FTM exchange. With reference to the shown FTM times, the first subscript indicates a position of the time in an FTM timing sequence and the second subscript indicates with which FTM frame transaction the time is associated (e.g., time $t_{1\_1}$ being the first time of the first FTM frame transaction). The time at which the FTM frame 314 is transmitted is known or determined by the responder 304 and may be included in the FTM frame 314 as a time stamp. The FTM frame 314 travels from the responder 304 through a wireless environment (e.g., wireless medium) to the initiator 302, which receives the FTM frame 314 at time $t_{2\_1}$ 318. As described herein, the FTM frame 314 may travel a first or direct path to the initiator 302 or other multipaths associated with reflections caused by objects in the wireless environment.

For packets or frames received at a device, such as the FTM frame 314, a time of arrival (ToA) may be calculated based on symbol-level synchronization performed by the receiving device. In some cases, accuracy of synchronization is based on or limited to a fraction of cyclic prefix size of a packet or frame, such as in OFDM systems. For example, a typical cyclic prefix size in wireless systems implemented in accordance with one of the IEEE 802.11 standards is fixed at approximately 800 nanoseconds, which is independent of channel or subcarrier bandwidth (e.g., 20 MHz, 40 MHz, 80 MHz, or 160 MHz). Due to ToA accuracy limitations associated with this fixed cyclic prefix size, a ToA may be estimated for a frame or packet to provide a more precise ToA in a nanosecond range. By so doing, RTT calculations based on the FTM exchange can be used to determine distances to a sub-meter range, thereby improving accuracy of timing-based ranging and location applications.

In the context of timeline 300, the initiator 302 determines time $t_{2\_1}$ 318 as a time of arrival for the FTM frame 314. The initiator 302 may determine the time $t_{2\_1}$ 318 in any suitable way, such as through frequency domain processing, time domain processing, or using an offset to correct for multipath delay. The initiator 302 then transmits an ACK 320 back to the responder 304 at time $t_{3\_1}$ 322. The time at which the ACK 320 is transmitted is known or determined by the initiator 302 and may be included in the ACK 320 as a time stamp or stored locally at the initiator 302. The ACK 320 travels from the initiator 302 through the wireless environment to the responder 304, which receives the ACK 320 at time $t_{4\_1}$ 324.

As described herein, the ACK 320 may also travel a first or direct path to the responder 304 or other multipaths associated with reflections caused by objects in the wireless environment. Because the responder 304 receives the ACK 320, the responder 304 determines time $t_{4\_1}$ 324 as a time of arrival for the ACK 320. The responder 304 may determine the time $t_{4\_1}$ 324 in any suitable way, such as through frequency domain processing, time domain processing, or using an offset to correct for multipath delay. An indication of the time $t_{4\_1}$ 324, such as a time stamp, can be sent back to the initiator 302 as any suitable beacon, packet, or frame, such as during a subsequent FTM request.

Having the times associated with an FTM frame exchange, such as $t_{1\_1}$ 316, $t_{2\_1}$ 318, $t_{3\_1}$ 322, and $t_{4\_1}$ 324, the FTM manager 120 of the initiator 302 can determine a round-trip time (RTT) for the exchange as shown in equation 1.

$$RTT = (t_4 - t_1) - (t_3 - t_2)$$  Equation 1: Round-Trip Time Calculation

In this example, the FTM exchange between the initiator 302 and responder 304 comprises a transaction of three FTM frames. Based on the parameters of the FTM request 306, the responder transmits a second FTM frame 326 at time $t_{1\_2}$ 328 to the initiator 302. The time at which the FTM frame 326 is transmitted is known or determined by the responder 304 and may be included in the FTM frame 326 as a time stamp. The FTM frame 326 travels from the responder 304 through the wireless environment to the initiator 302, which receives the FTM frame 326 at time $t_{2\_2}$ 330. Similar to FTM frame 314, the initiator 302 may estimate or determine $t_{2\_2}$ 330 as a time of arrival for the FTM frame 326.

The initiator 302 transmits an ACK 332 responsive to the FTM frame 326 back to the responder 304 at time $t_{3\_2}$ 334. Typically, the time at which the ACK 332 is transmitted is known or determined by the initiator 302 and may be included in the ACK 332 as a time stamp or stored locally at the initiator 302. The responder 304 receives the ACK 332 at time $t_{4\_2}$ 336, which the responder 304 may determine as a time of arrival for the ACK 332. In some cases, an indication of the time $t_{4\_2}$ 336 may be transmitted to the initiator 302, which the FTM manager 120 of the initiator 302 can store as part of a second set of FTM exchange data (e.g., t_2 FTM transaction).

Concluding the example FTM exchange illustrated by timeline 300, the responder 304 transmits a third FTM frame 338 at time $t_{1\_3}$ 340 to the initiator 302. As described herein, the initiator 302 may estimate or determine time $t_{2\_3}$ 342 as a time of arrival for the FTM frame 338. Responsive to the FTM frame 338, the initiator 302 transmits an ACK 344 at time $t_{3\_3}$, which may be stored by the FTM manager 120 for use in RTT calculations. Across the wireless environment, the responder 304 receives the ACK 344 at time $t_{4\_3}$ 348, which the responder 304 may determine as a time of arrival for the ACK 332. The responder 304 may then transmit an indication of time $t_{4\_3}$ 348 to the initiator 302 or piggyback the indication (e.g., time stamp) on a frame or packet subsequently transmitted to the initiator 302.

In some aspects, the initiator 302 may compile and average multiple RTTs that are calculated from respective FTM frame exchanges. By averaging multiple RTTs, the FTM manager 120 may calculate a more accurate RTT for frames exchanged with the responder 304. Based on an RTT or average RTT, the FTM manager 120 may calculate a distance between the initiator 302 and responder 304. For example, the FTM manager 120 may calculate a time-of-flight (ToF) for one frame communicated between the initiator 302 and responder 304 as one half of the RTT, which includes travel time of a round-trip of the packet exchange. With one half of RTT and using the speed of light (c) as a velocity at which the frames travel between the initiator 302 and responder 304, the distance (d) is calculated as shown by equation 2.

Distance based on RTT $$d = c \times \frac{RTT}{2}$$ Equation 2

Further, these determined distances can be used in combination with knowledge of locations of devices of a wireless network to enable a position of other network devices to be precisely determined through trilateration. As such, a host device 102 or client device 104 as may communicate as described herein with multiple devices of a wireless network to implement locating services capable of determining its position or a position another device of the network with approximately sub-meter precision.

Techniques of FTM with Frequency Domain Processing

The following discussion describes techniques of fine timing measurement with frequency domain processing. These techniques can be implemented using any of the environments and entities described herein, such as the FTM manager 120, time domain processing block 122, frequency domain processing block 124, FTM manager 136, and/or frequency domain processing block 138. These techniques include methods illustrated in FIGS. 4, 6, 7, and 8, each of which is shown as a set of operations performed by one or more entities. These methods are not necessarily limited to the orders or combinations of operations shown. Rather, any of the operations may be repeated, skipped, substituted, or re-ordered to implement various aspects described herein. Further, these methods may be used in conjunction with one another, in whole or in part, whether performed by the same entity, separate entities, or any combination thereof. In portions of the following discussion, reference will be made to the operating environment 100 of FIG. 1 and the wireless network of FIG. 2 by way of example. Such reference is not to be taken as limiting described aspects to the operating environment 100 or wireless network 200, but rather as illustrative of one of a variety of examples.

Figure 4:
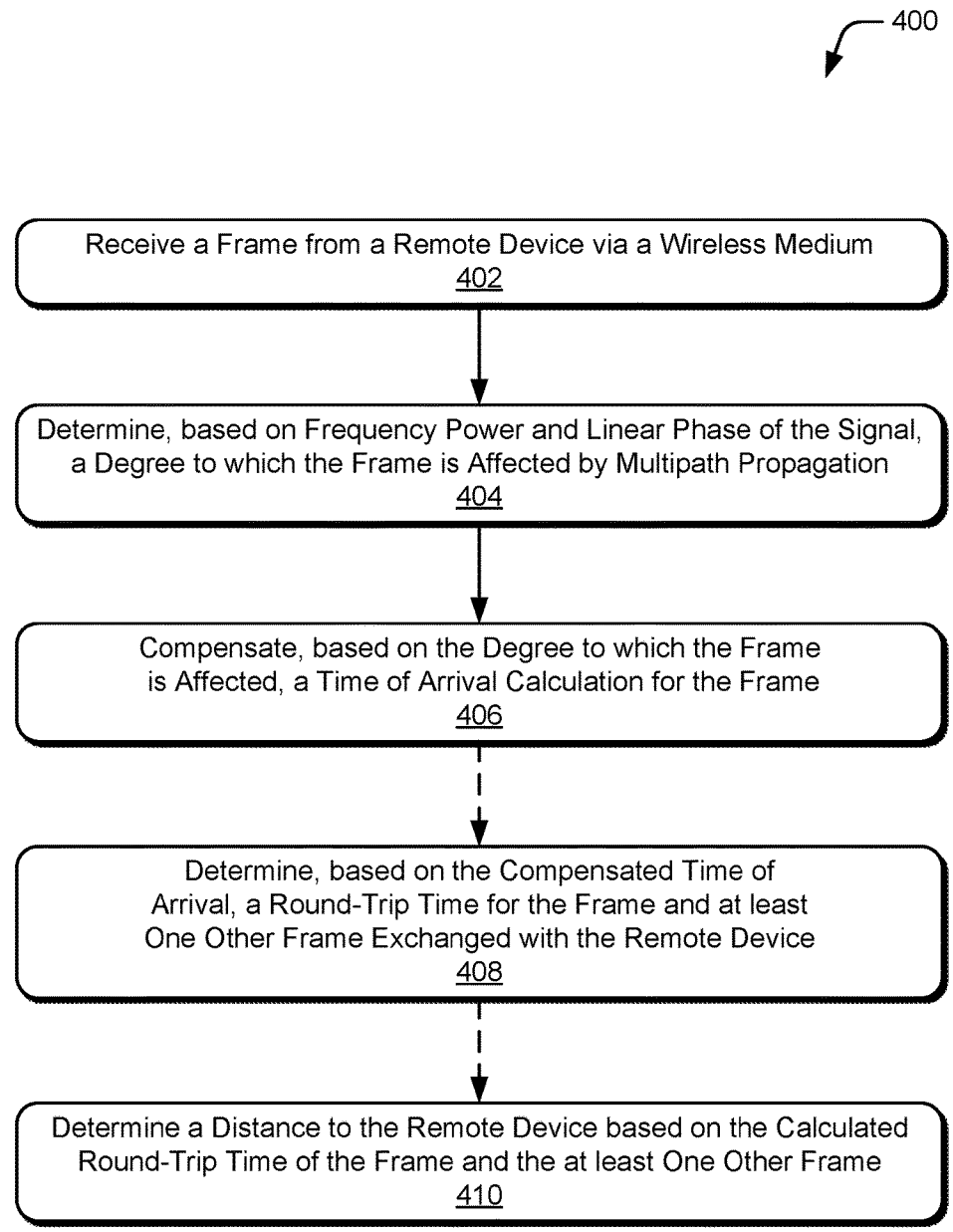
FIG. 4 illustrates an example method for compensating a time of arrival calculation for a frame affected by multipath propagation.
Figure 5:
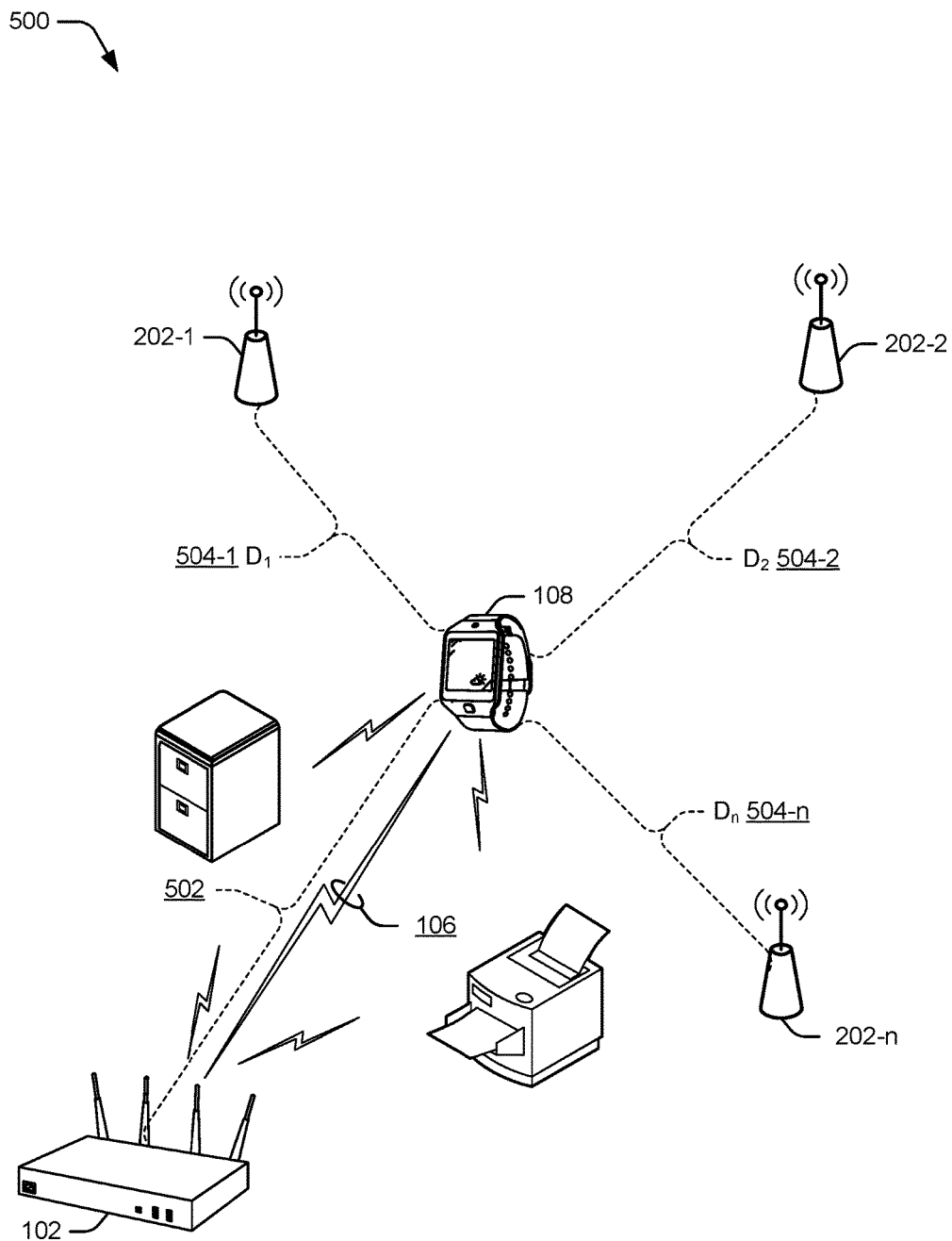
FIG. 5 illustrates an example of implementing FTM operations to determine distance between devices of the wireless network of FIG. 2.

FIG. 4 depicts an example method 400 for compensating a time of arrival calculation for a frame affected by multipath propagation, including operations performed by the FTM manager 136 and/or frequency domain processing block 138. In some aspects, operations of the method 400 may be implemented to provide a more accurate round-trip time or distance calculation between devices of a wireless network.

At 402, a frame is received from a remote device via a wireless medium. The frame may be an FTM frame transmitted from the remote device as part of an FTM frame exchange or transaction. In some cases, the frame includes a time stamp or indicates a time at which the frame was transmitted from the remote device. The wireless medium through which the frame travels may be a wireless environment that introduces or results in multipath propagation of the frame. As such, a direct path instance of frame and reflections of the frame may be received over a duration of time or with varying signal strength.

By way of example, consider the wireless network of FIG. 2 in which the devices may be implemented in an office environment. Here, the smart-watch 108 communicates with the host device 102 (e.g., access point) over wireless link 106, such as to enable a user of the smart-watch to receive email and navigation information related to a map of the office or industrial complex. With respect to the navigation information, assume that a mapping application of the smart-watch 108 makes a query to a location service running of the smart-watch. Being indoors, a GPS module of the smart-watch cannot reliably provide a location of the smart-watch and the location service implements a wireless networking-based algorithm in order to determine distances to wireless devices with known positions. To do so, the FTM manager 136 of the smart-watch 108 initiates an FTM exchange with the host device 102. In the context of operation 402, the smart-watch receives not only an instance of an FTM frame directly from the host device 102, but multipath reflections, a few of which are illustrated as reflecting off a metal filing cabinet and printer in the office.

At 404, a degree to which the frame is affected by multipath propagation is determined based on frequency power and linear phase of the frame. The degree or amount by which the frame is affected can be determined based on any suitable data or measurements. In some cases, the degree or amount of multipath propagation effect is determined based on a ratio of frequency power of the frame and a linear phase of the frame. In such cases, the frequency power and linear phase can be determined with frequency domain capabilities of a device at which the frame is received. Alternately or additionally, time domain processing capabilities of the device may be used to determine an offset between the linear phase and first path of the frame.

In the context of the present example, the FTM manager 136 of the smart-watch 108 accesses the frequency domain processing block 138 to determine frequency power and linear phase for the frame. To do so, the FTM manager 136 may also access a modulator of the receiver 142 for frequency domain channel estimates, which may then be used to determine the linear phase as the phase of complex phase-roll of the channel estimates. The FTM manager 136 then calculates a ratio of phase-roll magnitude to frequency power to determine the degree to which the frame is affected by multipath propagation. Here, assume that the ratio indicates moderate effects of multipath propagation due to the complex office environment in which the wireless network is implemented.

At 406, a time of arrival calculation is compensated based on the degree to which the frame is affected by multipath propagation. Depending on severity, multipath propagation typically shifts or delays linear phase of a frame from that of a direct path or line-of-sight frame. Thus, linear phase or other phase based measurements may reflect or be biased backward (e.g., delayed) due to the effects of multipath propagation through a wireless channel. In some cases, the time of arrival calculation is compensated by a small amount, such as by shifting the ToA forward a few nanoseconds, when the multipath effects are small. In other cases, such as when the ratio of phase-roll to frequency power is large, a large amount of bias is removed from the ToA calculation. Because multipath propagation affects frequency domain based ToA calculations in particular, some devices may compensate ToA calculations by removing an average amount of bias from all ToA measurements.

Continuing the ongoing example, the FTM manger 136 of the smart-watch 108 compensates a time of arrival calculation for the FTM frame received from the host device. As noted, the determined ratio of the phase-roll magnitude to the frequency power for the frame reflects moderate multipath effects caused by the office environment. Accordingly, the FTM manger 136 determines compensation for the FTM frame's calculated time of arrival (e.g., a linear phase-based ToA) based on the ratio of the phase-roll magnitude to the frequency power. Based on the determined compensation, the FTM manager 136 then removes a corresponding amount of bias or delay from the time of arrival to provide a compensated time of arrival for the FTM frame.

Optionally at 408, a round-trip time for the frame and at least one other frame exchanged with the remote device is calculated based on the compensated time of arrival. In some cases, a time of arrival for the other frame may also be compensated to account for multipath effects of the wireless environment. In the context of the present example, assume that the smart-watch 108 transmits an ACK to the host device 102 as part of the FTM exchange. On a subsequent FTM burst, the host device 102 transmits a time of arrival for the ACK to the smart-watch 108, which enables the FTM manager 136 to determine a round-trip time for the FTM frame and the ACK communicated with the host device 102.

Optionally at 410, a distance to the remote device is determined based on the round-trip time of the frame and the at least one other frame. As described herein, a distance between two devices can be determined with a round-trip time derived from an FTM exchange. In some cases, the round-trip time is an average of multiple round-trip times determined from respective FTM frame transactions. Alternately or additionally, the determined distance can be provided to a location-based application to enable a location or position of the device to be determined, such as relative to devices of fixed positions or known locations.

In the context of the present example, the FTM manager 136 of the smart-watch 108 multiplies half of the determined round-trip time (e.g., the frame's time of flight) by the speed of light to determine distance 502 to the host device 102. Here, assume the smart-watch 108 also implements similar operations with wireless devices 202-1 through 202-n of the wireless network to determine distances 504-1 through 504-n to those devices, respectively. The location service of the smart-phone 108 can then use the determined distances and known locations of the host device 102 and wireless devices 202-1 through 202-n to determine a position of the smart-phone. Concluding the present example, the location service of the smart-watch 108 provides this position information to the mapping application, which updates the user's position within the map of the office. The mapping application can then provide the user with directional instructions to a conference room in which his next meeting is scheduled.

Figure 6:
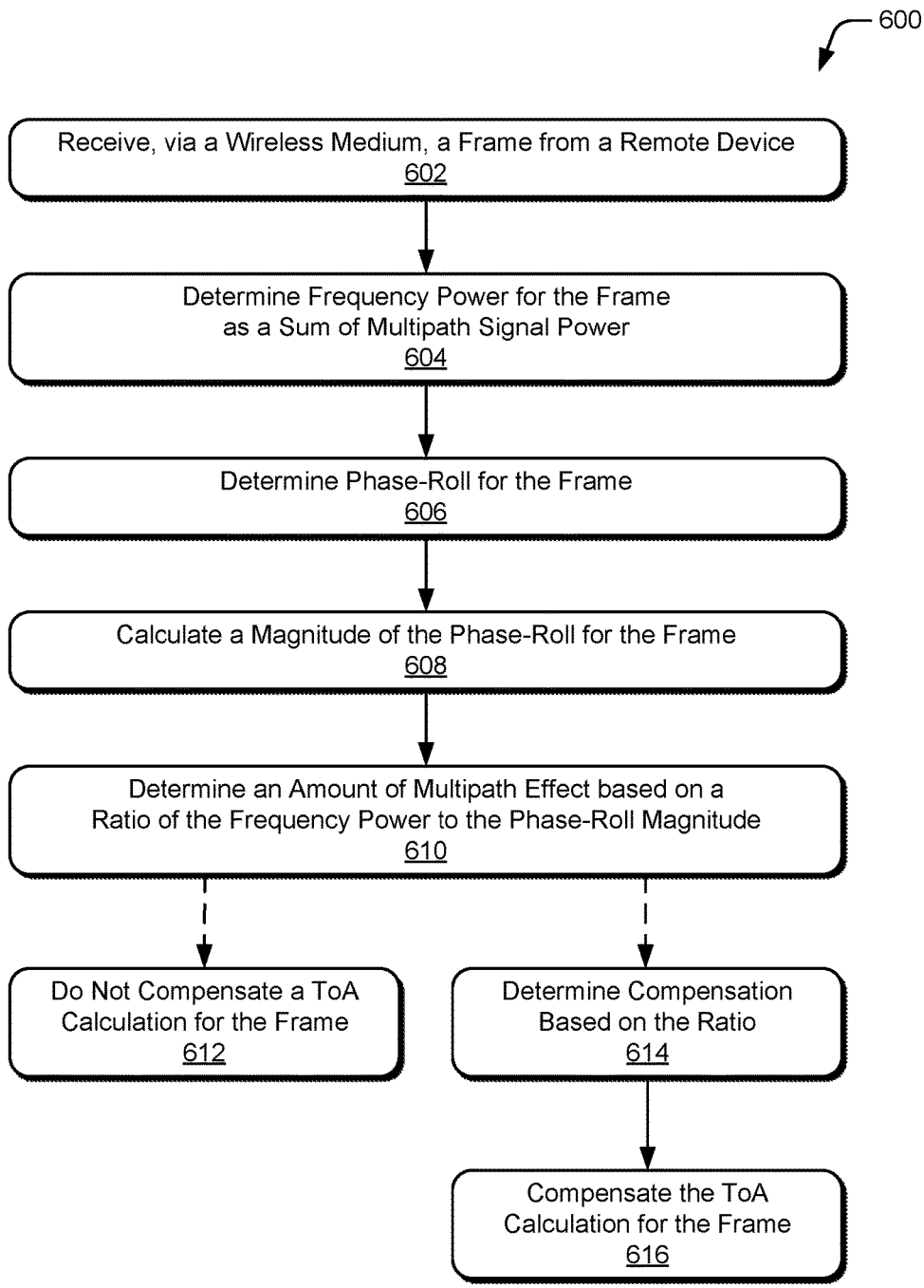
FIG. 6 illustrates an example method for determining an amount of multipath effect based on frequency power and phase-roll magnitude.

FIG. 6 depicts an example method 600 for determining an amount of multipath effect based on frequency power and phase-roll magnitude, including operations performed by the FTM manager 136 and/or the frequency domain processing block 138. In some aspects, operations of method 600 may be implemented to compensate a time of arrival calculated using frequency domain processing.

At 602, a frame is received from a remote device via a wireless medium. In some cases, the frame includes a time stamp or indicates a time at which the frame was transmitted from the remote device. In other cases, a time stamp or indication of transmission time for the frame are received with a subsequently received frame or packet. The wireless medium through which the frame travels may include objects that introduce or result in multipath propagation of the frame. As such, a first path instance of frame and reflections of the frame may be received over a duration of time or with varying signal strength.

At 604, frequency power is determined for the frame as a sum of multipath signal power. The multipath signal power may include power of a first path signal and any suitable number of multipath signals caused by reflections in the wireless medium. In some cases, the frequency power is determined with frequency domain processing and without time domain processing, such as in low-complexity wireless devices. Generally, a multipath channel may be represented in the time domain as shown in equation 3, in which the channel H[k] relates to the time domain with an amplitude (A) of path (p) and delay (T) of path (p).

Time Domain Channel $$H[k] = \sum_p A_p e^{-j2\pi \frac{k}{T} \tau_p} \qquad \text{Equation 3}$$

The sum of path powers may be determined using frequency domain estimates of channel H[k] as shown in equation 4.

Frequency Power $$\sum_k |H[k]|^2 \approx K \sum_p |A_p|^2 \qquad \text{Equation 4}$$

with delays spaced at least $$\text{one sample apart } |\tau_p - \tau_l| > \frac{T}{L}, p \neq l$$

At 606, phase-roll for the frame is determined. The phase-roll may be determined based on frequency domain channel estimates. As such, the phase-roll can be calculated without the use of complex time domain processing capabilities or in devices that lack such capabilities. In some cases, the phase-roll is determined for additive white Gaussian noise (AWGN) channels. The phase-roll or complex phase-roll can be determined as shown in equation 5.

$$\Sigma_k H[k]H^*[k-1] \quad \text{Equation 5: Phase-Roll}$$

At 608, a magnitude of the phase-roll is calculated. In some cases, the magnitude is determined for phase-roll AWGN channels as shown in equation 6.

$$|\Sigma_k H[k]H^*[k-1]| \quad \text{Equation 6: Phase-Roll Magnitude for AWGN Channel}$$

At 610, an amount of multipath effect is determined bases on a ratio of the frequency power to the phase-roll magnitude. In some cases, the ratio is approximated or represented by a scaling factor ($\alpha$) applied to the phase-roll. For frames with a dominant first path or line of sight signal component, the ratio of frequency power and phase-roll may close as shown in equation 7.

Frequency Power and Phase-Roll Magnitude with Scaling Factor $$\left|\sum_k H[k]H^*[k-1]\right| \approx K \sum_p |A_p|^2 e^{-j2\pi \frac{\tau_l}{T}} \approx \alpha \sum_k |H[k]|^2 \quad \text{Equation 7}$$

Here, as shown in equation 7, the magnitude of the phase-roll can be close to the frequency power and scaled down by ($\alpha$), which is indicative of a degree or amount of multipath effect that skews or delays linear phase-based calculations for a frames time of arrival. For example, the smaller the scaling factor ($\alpha$), the larger the delay spread associated with the time of arrival calculation as shown by equation 8.

Delay Spread for Small $\alpha$ $$|\tau_p - \tau_l|\frac{2\pi}{T} \gg 0, p \neq l \quad \text{Equation 8}$$

From operation 610, the method 600 may proceed to operation 612 or operation 614. For example, the method 600 may proceed to operation 612 when little or no multipath effects are indicated by the ratio of frequency power and phase-roll magnitude. As such, at operation 612, a time of arrival for the frame is not compensated because the time of arrival calculation is likely not skewed or delayed by multipath signals.

Optionally at 614, compensation for the time of arrival is determined based on the ratio or scaling factor of the frequency power and phase-roll of the frame. Because the ratio or scaling factor indicates a degree to which multipath has affected, the compensation may be calculated to appropriately address a wide range or different degrees of multipath effects. Alternately, the compensation may be a predefined or default amount that is applied to the time of arrival responsive to an amount of multipath effect exceeding a multipath compensation threshold. For example, the threshold may be a threshold for a minimum amount of multipath that causes or triggers compensation of the time of arrival or time of arrival calculation.

At 616, the time of arrival calculation is compensated based on the ratio of the frequency power and phase-roll magnitude. Compensating the time of arrival may include shifting the calculated time of arrival to remove delay caused by multipath effects, such as when time of arrival is based on linear phase of the frame. By so doing, the time of arrival may be estimated or corrected to provide a time of arrival within a range of nanoseconds. Such precise time of arrivals, which are used for round-trip timing, may enable distance or location calculations that are accurate to an approximate range of a meter or less.

Figure 7:
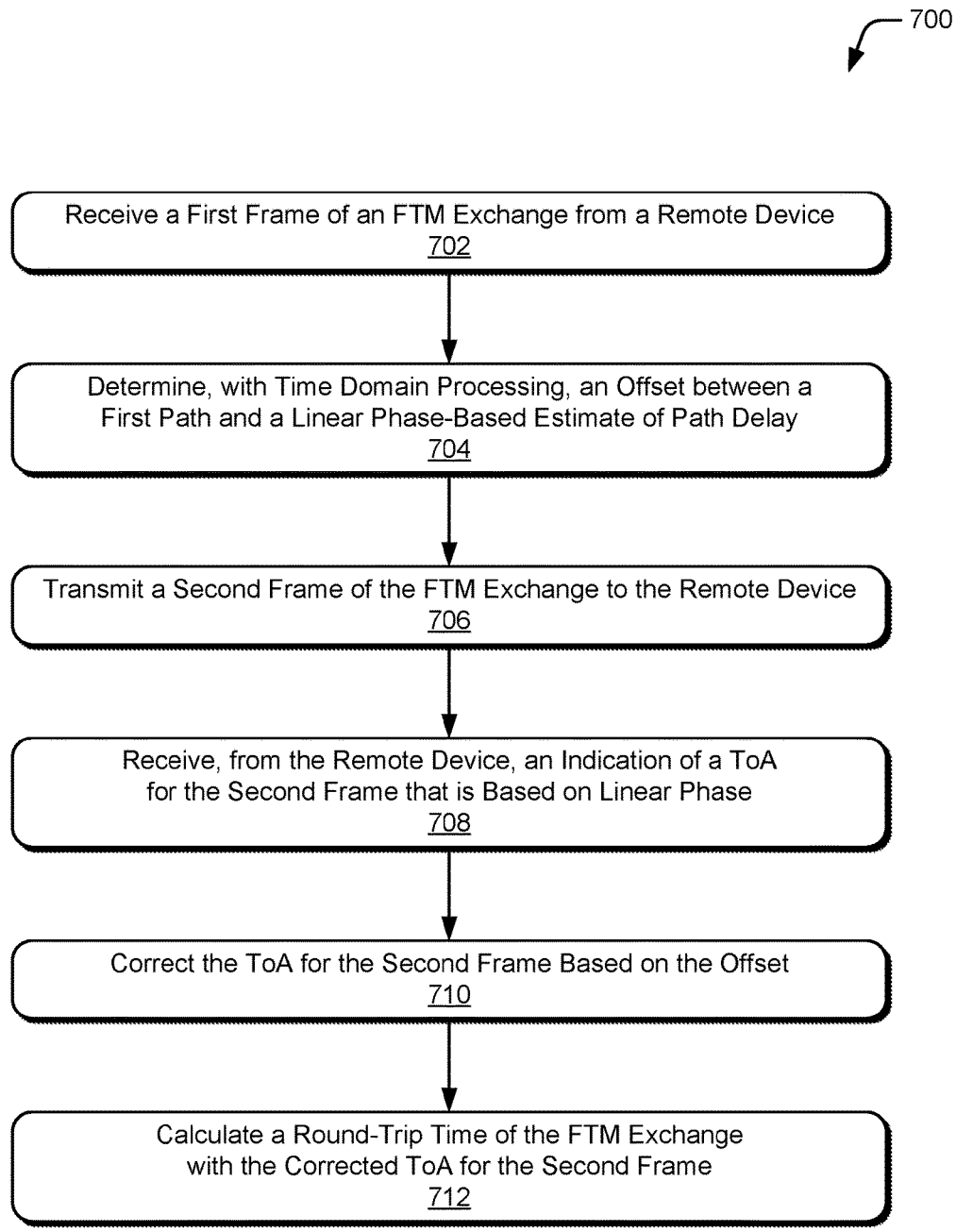
FIG. 7 illustrates an example method for correcting a time of arrival using an offset determined with time domain processing.

FIG. 7 depicts an example method 700 for correcting a time of arrival using an offset determined with time domain processing, including operations performed by the FTM manager 120, the time domain processing block 122, and/or the frequency domain processing block 124.

At 702, a first frame of an FTM exchange is received from a remote device. In some cases, the first frame includes a time stamp or indicates a time at which the first frame was transmitted from the remote device. The wireless medium through which the first frame travels may include objects that introduce or result in multipath propagation of the frame. As such, a first path instance of frame and reflections of the frame may be received over a duration of time or with varying signal strength.

At 704, an offset between a first path and a linear phase-based estimate of path delay is determined. The first path may be calculated with time domain processing, such as through an inverse Fourier transform of channel estimates for the frame. In some cases, an estimate of a time domain channel is filtered via a low-pass filter to determine the first path timing of the frame. The linear phase-based estimate may be determined as described herein, such as by using frequency domain channel estimates. Generally, this offset may represent a difference between respective time of arrival calculations provided by time domain processing and frequency domain processing.

At 706, a second frame of the FTM exchange is transmitted to the remote device. The second frame may include an acknowledgement or ACK sent in response to the first frame. In some cases, an indication of the offset may be transmitted with the ACK to the remote device, such as when the remote device lacks time domain processing capabilities. Alternately or additionally, transmission of the second frame may be effective to initiate another FTM frame transaction with the remote device.

At 708, an indication of time of arrival for the second frame is received from the remote device. The indication may be received as any suitable type of beacon, packet, or frame transmitted by the remote device. The indication may also be effective to indicate that the time of arrival was calculated with frequency domain processing or without the use of time domain processing. In some cases, the indication of the time of arrival for the second frame includes a time stamp piggybacked with another FTM frame transmitted by the remote device.

At 710, the time of arrival for the second frame is corrected based on the offset between the first path and linear phase-based estimate of path delay. Because the time of arrival for the second frame is calculated without time domain processing, using the offset may be effective to provide a time of arrival that accurately reflects the first path between the device and the remote device. This can effectively leverage symmetry of the wireless channel and/or multiple FTM transactions to provide more accurate time of arrivals for frames communicated through the wireless channel.

At 712, a round-trip time of the FTM exchange is calculated with the corrected time of arrival for the second frame. As described herein, respective times of arrival for FTM frames can be used to determine round-trip times for FTM exchanges. By using the corrected time of arrival, an FTM initiator with time domain processing can correct a time of arrival sent by a device that lacks time domain processing, which often typically provides less accurate time of arrival due to reliance of frequency domain processing. As such, the method 700 can address this asymmetry in processing capabilities to provide more accurate round-trip time calculations, which enable distances between, and location of, devices to be determined with more accuracy.

Figure 8:
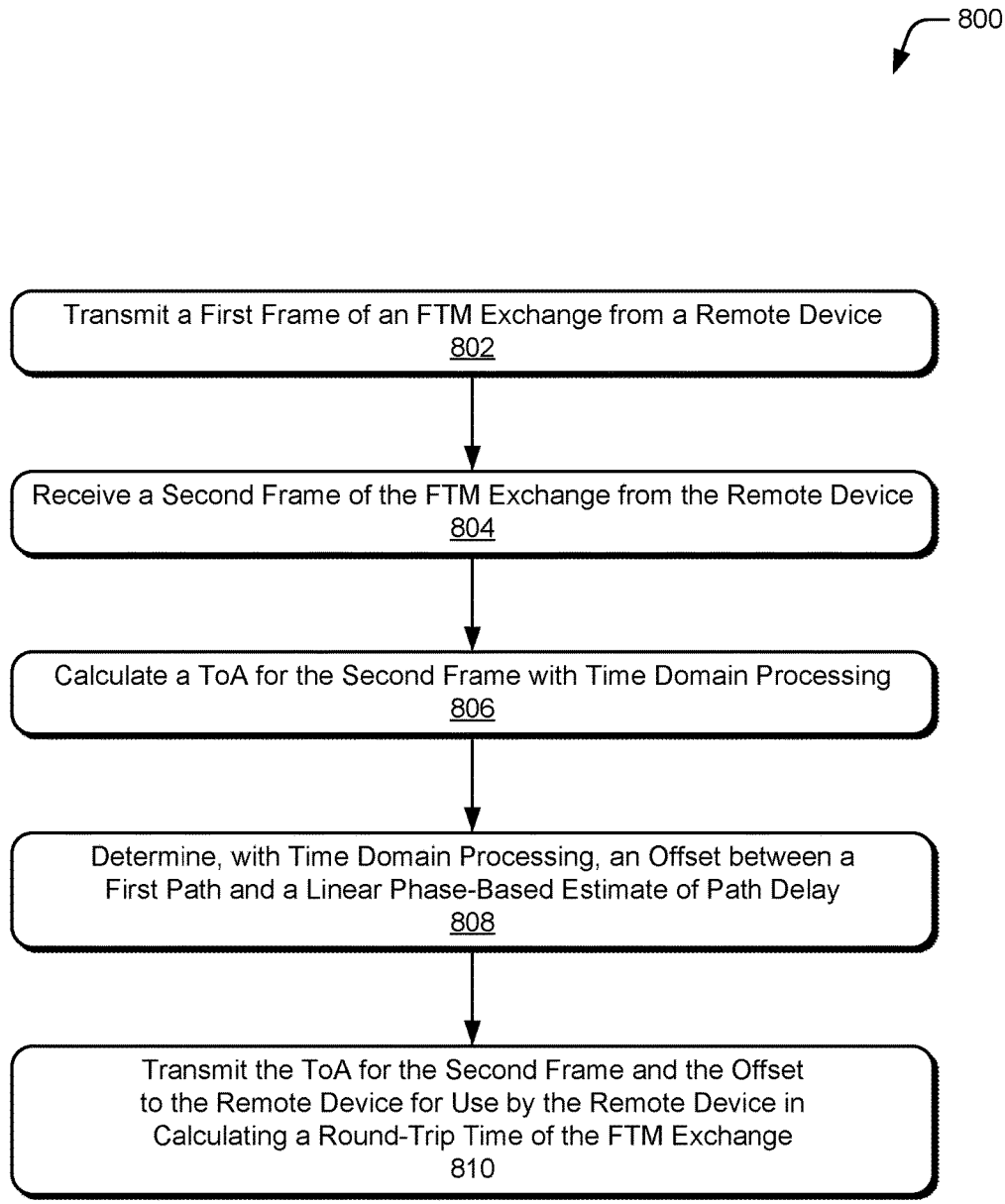
FIG. 8 illustrates an example method for transmitting a corrected time of arrival to a device for use in calculating round-trip time.

FIG. 8 depicts an example method 800 for transmitting a corrected time of arrival to a device for use in calculating round-trip time, including operations performed by the FTM manager 120, the time domain processing block 122, and/or the frequency domain processing block 138.

At 802, a first frame of an FTM exchange is transmitted to a remote device. The first frame may be an FTM frame sent responsive to an FTM request received from an initiating device. In some cases, the first frame includes a time stamp or indicates a time at which the first frame was transmitted to the remote device. The wireless medium through which the first frame travels may include objects that introduce or result in multipath propagation of the frame. As such, a first path instance of frame and reflections of the frame may be received over a duration of time and/or with varying signal strength.

At 804, a second frame of the FTM exchange is received from the remote device. The second frame may include an acknowledgement or ACK transmitted by the remote device in response to the first frame. In some cases, the ACK indicates reception of the first frame and that the remote device is ready for transmission of a next FTM frame of an FTM exchange or frame burst. In other cases, the second frame may comprise an FTM request or an FTM frame transmitted by the remote device.

At 806, a time of arrival for the second frame is calculated with time domain processing. In some cases, the time domain processing is used to determine an estimate for the first path of the frame through the wireless medium. In such cases, the first path may be determined through an inverse Fourier transform of channel estimates for the second frame. Generally, using time domain processing provides a time of arrival that is more accurate than that provided by frequency domain processing, which is unable to implement complex time domain operations (e.g., Fourier transforms).

At 808, an offset between first path and a linear phase-based estimate of the path delay is determined. The first path may be calculated with time domain processing, such as through the inverse Fourier transform performed at operation 806. The linear phase-based estimate may be determined as described herein, such as by using frequency domain channel estimates. Generally, this offset may represent a difference between respective time of arrival calculations provided by frequency domain processing and time domain processing.

At 810, the time of arrival for the second frame and offset are transmitted to the remote device. The time of arrival and offset may be transmitted separately via different frames or packets, or combined in one transmission. Although the time of arrival for the second frame may be part of an FTM exchange, the addition of the offset can enable the remote device to correct or compensate a locally determined time of arrival. For example, if the remote device lacks time domain processing capabilities, providing the offset enables the remote device to correct a locally determined time of arrival for the first frame transmitted at operation 802. Due to symmetry of the wireless channel, the remote device may correct locally determined times of arrival and calculate more accurate round-trip times for synchronization and other uses (e.g., deriving distances).

Figure 9:
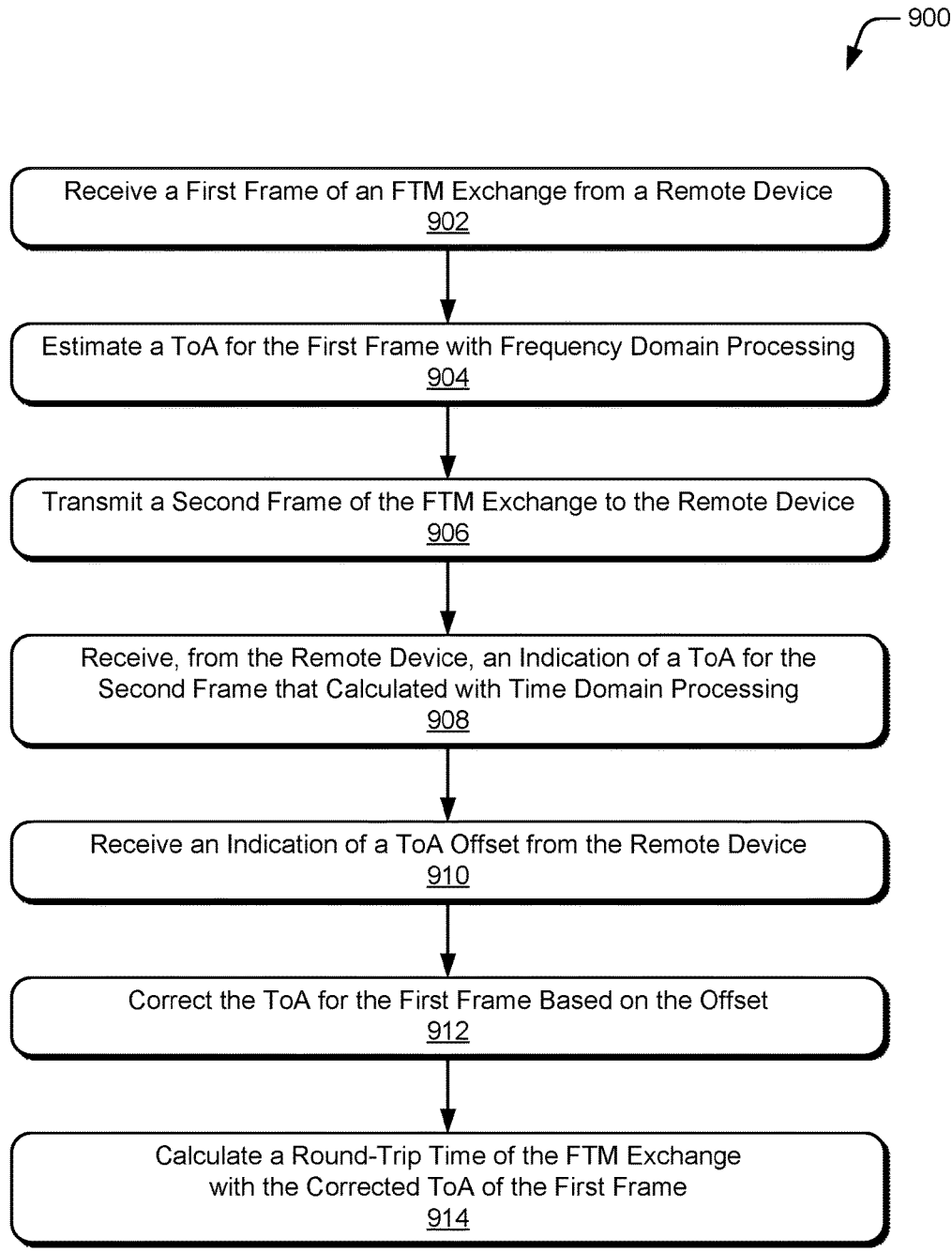
FIG. 9 illustrates an example method for calculating round-trip time with a corrected time of arrival received from a remote device.

FIG. 9 depicts an example method 900 for calculating round-trip time with a corrected time of arrival received from a remote device, including operations performed by the FTM manager 136.

At 902, a first frame of an FTM exchange is received from a remote device. The first frame may be an FTM frame sent responsive to a FTM request previously transmitted to the remote device. In some cases, the first frame includes a time stamp or indicates a time at which the first frame was transmitted to the remote device. The wireless medium through which the first frame travels may include objects that introduce or result in multipath propagation of the frame. As such, a first path instance of frame and reflections of the frame may be received over a duration of time and/or with varying signal strength.

At 904, a time of arrival for the first frame is estimated with frequency domain processing. In some cases, the device at which the first frame is received lacks time domain processing capabilities. The time of arrival may be estimated using any suitable measurements or calculations, such as a linear phase of the frame. Due to the frequency domain processing, the estimated time of arrival may include an amount of delay caused by multipath propagation.

At 906, a second frame of the FTM exchange is transmitted to the remote device. The second frame may include an acknowledgement or ACK transmitted to the remote device in response to the first frame. In some cases, the second frame indicates that the device lack time domain processing, such as to notify the remote device of the transmitting device's configuration or capabilities. Alternately or additionally, the ACK is used to indicate reception of the first frame and effective to cause the remote device to initiate a next frame transaction of an FTM exchange.

At 908, an indication of a time of arrival for the second frame is received from the remote device. The indication may also indicate that the time of arrival was determined using time domain processing, and thus is not effected by delay related to frequency domain processing. In some cases, the indication is piggybacked or sent with another FTM frame of the FTM exchange. Alternately or additionally, the indication may be transmitted as a separate packet or frame.

At 910, an indication of the offset is received from the remote device. This indication may reflect an offset of a time domain estimate of the first path of the frame and a frequency domain estimate that includes multipath delay. In some cases, this offset indication is received with the indication of the time of arrival for the second frame. Alternately or additionally, the indication of the offset may be sent separately as any suitable type of packet or frame, such as a purpose-specific FTM offset frame.

At 912, a time of arrival for the first frame is corrected based on the offset received from the remote device. Because the time of arrival for the first frame is calculated by the device without time domain processing, using the offset may be effective to provide a time of arrival that accurately reflects the first path between the device and the remote device. This can effectively leverage symmetry of the wireless channel and/or multiple FTM transactions to provide more accurate time of arrivals for frames communicated through the wireless channel.

At 914, a round-trip time of the FTM exchange is calculated with the corrected time of arrival of the first frame. As described herein, respective times of arrival for FTM frames can be used to determine round-trip times for FTM exchanges. By using the corrected time of arrival for the first frame, an FTM initiator without time domain processing can correct, with the offset, a locally determined time of arrival. As such, the method 900 can address this asymmetry in processing capabilities to provide more accurate round-trip time calculations, which enable distances between, and location of, devices to be determined with more accuracy.

System-on-Chip

Figure 10:
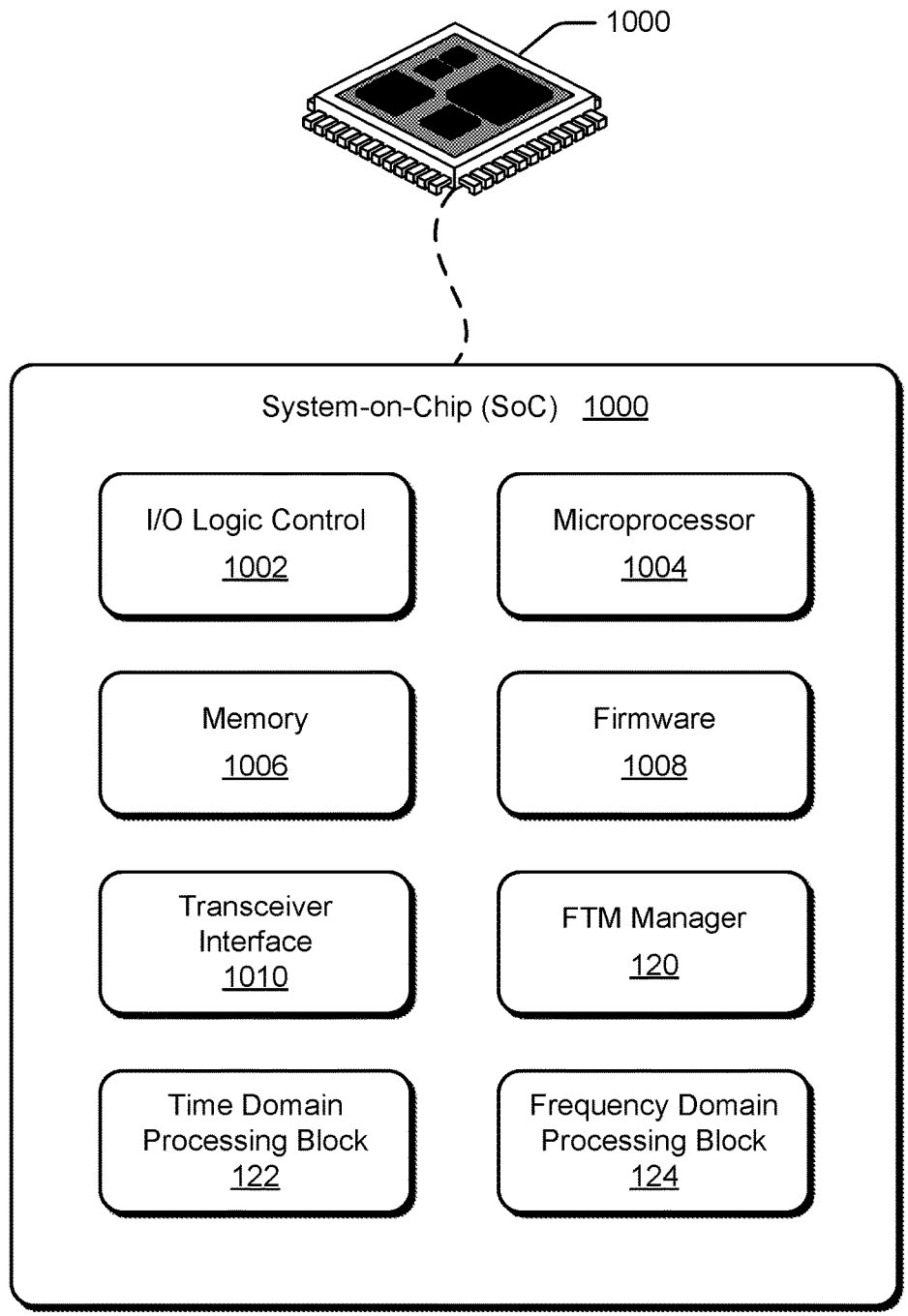
FIG. 10 illustrates an example System-on-Chip (SoC) environment for implementing aspects of fine timing measurement with frequency domain processing.

FIG. 10 illustrates an exemplary System-on-Chip (SoC) 1000 that can implement various aspects of fine timing measurement with frequency domain processing. The SoC 1000 can be implemented in any suitable device, such as an access point, wireless router, station management entity, set-top box, wireless base station, drone controller, server, mesh networking node, network-attached storage, smart appliance, or any other suitable type of device. Although described with reference to a SoC, the entities of FIG. 10 may also be implemented as a network interface controller (NIC), application-specific standard part (ASSP), digital signal processor (DSP), programmable SoC (PSoC), or field-programmable gate array (FPGA). With reference to the devices described herein, the SoC 1000 may be embodied in, or implement functionalities of, an FTM initiator or an FTM responder in accordance with one or more aspects.

The SoC 1000 can be integrated with electronic circuitry, a microprocessor, memory, input-output (I/O) logic control, communication interfaces, other hardware, firmware, and/or software useful to provide functionalities of a device, such as any of the devices listed herein. The SoC 1000 may also include an integrated data bus (not shown) that couples the various components of the SoC for data communication between the components. The integrated data bus or other components of the SoC 1000 may be exposed to or enable access of external components, such as for wireless communication. For example, the SoC 1000 may be implemented as a baseband processor or modem for managing or controlling a transceiver or other hardware to communicate over a wireless medium.

In this example, the SoC 1000 includes various components such as input-output (I/O) logic control 1002 (e.g., to include electronic circuitry) and a microprocessor 1004 (e.g., any of a microcontroller, processor core, application processor, or DSP). The SoC 1000 also includes memory 1006, which can be any type and/or combination of RAM, SRAM, DRAM, low-latency nonvolatile memory, ROM, one-time programmable (OTP) memory, and/or other suitable electronic data storage. In the context of this disclosure, the memory 1006 stores data, instructions, or other information via non-transitory signals, and does not include carrier waves or other transitory signals.

Alternately or additionally, the SoC 1000 may comprise a data interface (not shown) for accessing additional or expandable off-chip memory, such as external SRAM or flash memory. In some cases, the SoC 1000 includes various applications, operating systems, and/or software, such as firmware 1008, which can be computer-executable instructions maintained by the memory 1006 and executed by the microprocessor 1004. In this example, the SoC 1000 includes a transceiver interface 1010 for controlling or communicating with components of a local or off-chip wireless transceiver. Generally, the transceiver interface 1010 may be implemented with or to control components, such as the transmitter 126 and receiver 128, to facilitate communication between devices of a wireless network.

The SoC 1000 also includes an FTM manager 120, time domain processing block 122, and frequency domain processing block 124, which may be embodied as disparate or combined components, as described in relation to aspects presented herein. Although shown as including both time domain capabilities and frequency domain capabilities, in some cases the SoC 1000 may be implemented with only frequency domain capabilities (e.g., without time domain processing block 122). Examples of these components and/or entities, and their corresponding functionality, are described with reference to the respective components of the environment 100 shown in FIG. 1 and wireless network shown in FIG. 2. The FTM manager 120, either in whole or part, can be implemented as processor-executable instructions (e.g., firmware 1008) maintained by the memory 1006 and executed by the microprocessor 1004 to implement various aspects and/or features of fine timing measurement with frequency domain processing as described herein.

The FTM manager 120, either independently or in combination with other entities, can be implemented with any suitable combination of components or circuitry to implement various aspects and/or features described herein. The FTM manager 120 may also be provided integral with other entities of the SoC 1000, such as integrated with the microprocessor 1004, a network interface controller, or the transceiver interface 1010 the SoC 1000. Alternately or additionally, the FTM manager 120 and the other components can be implemented as hardware, firmware, fixed logic circuitry, or any combination thereof.

Although the subject matter has been described in language specific to structural features and/or methodological operations, it is to be understood that the subject matter defined in the appended claims is not necessarily limited to the specific features or operations described herein, including orders in which they are performed.

What is claimed is:

1. A method comprising:
    receiving, at a first device and via a wireless medium, a frame from a second device;
    determining a frequency power of the frame;
    determining a linear phase of the frame;
    determining, based on the frequency power and the linear phase of the frame, a degree to which the frame is affected by multipath propagation in the wireless medium; and
    compensating, based on the degree to which the frame is affected by the multipath propagation, a time of arrival calculation for the frame to provide a compensated time of arrival for the frame.

2. The method as recited in claim 1, wherein the frequency power and the linear phase of the frame are determined with frequency domain processing.

3. The method as recited in claim 1, wherein the frequency power and the linear phase of the frame are determined without time domain processing and the first device does not possess time domain processing capabilities.

4. The method as recited in claim 1, further comprising determining, based on the compensated time of arrival, a round-trip time of communication for the frame and at least one other frame exchanged between the first device and the second device.

5. The method as recited in claim 4, wherein:
the frame is a fine timing measurement (FTM) frame;
the at least one other frame is an FTM frame; or
the frame and the at least one other frame are communicated between the first device and second device as part of an FTM frame exchange.

6. The method as recited in claim 4, further comprising determining a distance between the first device and second device based on the round-trip time of the frame and the at least one other frame.

7. The method as recited in claim 1, further comprising determining the frequency power of the frame by summing respective power associated with multiple paths traversed by the frame or a reflection of the frame.

8. A System-on-Chip (SoC) comprising:
a wireless communication controller;
a hardware-based processor configured to implement frequency domain data processing; and
a fine timing measurement (FTM) manager configured to:
receive, via the wireless communication controller, a frame transmitted by a remote device through a wireless medium;
determine a frequency power of the frame;
determine a linear phase of the frame;
determine, based on the frequency power and the linear phase of the frame, a degree to which the frame is affected by multipath propagation in the wireless medium; and
compensate, based on the degree to which the frame is affected by the multipath propagation, a time of arrival calculation for the frame to provide a compensated time of arrival for the frame.

9. The SoC as recited in claim 8, wherein the frequency power and the linear phase of the frame are determined based on frequency domain calculations implemented by the hardware-based processor of the SoC.

10. The SoC as recited in claim 8, wherein the frequency power and the linear phase of the frame are determined without time domain processing and the SoC does not possess a time domain processor or time domain processing capabilities.

11. The SoC as recited in claim 8, wherein the FTM manager is further configured to determine, based on the compensated time of arrival, a round-trip time of communication for the frame and at least one other frame exchanged between a device in which the SoC is embodied and the remote device.

12. The SoC as recited in claim 11, wherein:
the frame is a fine timing measurement (FTM) frame;
the at least one other frame is an FTM frame; or
the frame and the at least one other frame are communicated between the device and the remote device as part of an FTM frame exchange.

13. The SoC as recited in claim 11, wherein the FTM manager is further configured to determine a distance between the device and remote device based on the round-trip time of the frame and the at least one other frame.

14. The SoC as recited in claim 8, wherein the FTM manager is further configured to transmit, prior to receiving the frame, a request to the remote device effective to initiate an FTM exchange between the remote device and a device in which the SoC is embodied.

15. The SoC as recited in claim 8, wherein the SoC is embodied in one of an access point, wireless router, wireless network interface, a set-top box, base station, or a controller of the remote device.

16. A non-transitory computer-readable storage media comprising instructions that, responsive to execution by a hardware-based processor, implement a fine timing measurement (FTM) manager to:
receive, via a wireless communication controller associated with the hardware-based processor, a frame transmitted by a remote device through a wireless medium;
determine a frequency power of the frame;
determine a linear phase of the frame;
determine, based on the frequency power and the linear phase of the frame, a degree to which the frame is affected by multipath propagation in the wireless medium; and
compensate, based on the degree to which the frame is affected by the multipath propagation, a time of arrival calculation for the frame to provide a compensated time of arrival for the frame.

17. The non-transitory computer-readable storage media as recited in claim 16, wherein the hardware-based processor is configured to implement frequency domain functionality and the FTM manager is further configured to determine the frequency power and the linear phase of the frame using the frequency domain functionality of the hardware-based processor.

18. The non-transitory computer-readable storage media as recited in claim 16, wherein the hardware-based processor does not possess time domain processing functionality and the FTM manager determines the frequency power and the linear phase of the frame without time domain processing functionality.

19. The non-transitory computer-readable storage media as recited in claim 16, wherein the FTM manager is further configured to determine, based on the compensated time of arrival, a round-trip time of communication for the frame and at least one other frame exchanged between a device in which the FTM manager is embodied and the remote device.

20. The non-transitory computer-readable storage media as recited in claim 19, wherein:
the frame is a fine timing measurement (FTM) frame;
the at least one other frame is an FTM frame; or
the frame and the at least one other frame are communicated between the device and the remote device as part of an FTM frame exchange.

* * * * *